(12) United States Patent
Vattem et al.

(10) Patent No.: US 10,425,325 B2
(45) Date of Patent: Sep. 24, 2019

(54) OPTIMIZING TRAFFIC PATHS TO ORPHANED HOSTS IN VXLAN NETWORKS USING VIRTUAL LINK TRUNKING-BASED MULTI-HOMING

(71) Applicant: Dell Products LP, Round Rock, TX (US)

(72) Inventors: Phaniraj Vattem, Santa Clara, CA (US); Mukesh Moopath Velayudhan, Fremont, CA (US); Anoop Ghanwani, Roseville, CA (US); Swaminathan Sundararaman, Cupertino, CA (US); Mohan Ayalasomayajula, Fremont, CA (US); Bhavini Gada, San Jose, CA (US)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 15/798,255

(22) Filed: Oct. 30, 2017

(65) Prior Publication Data
US 2019/0132241 A1    May 2, 2019

(51) Int. Cl.
*H04L 12/709* (2013.01)
*H04L 12/46* (2006.01)
*H04L 12/721* (2013.01)

(52) U.S. Cl.
CPC ........ *H04L 45/245* (2013.01); *H04L 12/4641* (2013.01); *H04L 45/66* (2013.01)

(58) Field of Classification Search
None
See application file for complete search history.

(56) References Cited

U.S. PATENT DOCUMENTS

| | | | |
|---|---|---|---|
| 8,953,590 B1 * | 2/2015 | Aggarwal | H04L 12/4675 370/389 |
| 2015/0016300 A1 * | 1/2015 | Devireddy | H04L 41/0893 370/254 |
| 2015/0063353 A1 * | 3/2015 | Kapadia | H04L 45/745 370/392 |
| 2015/0127701 A1 * | 5/2015 | Chu | H04L 45/22 709/201 |
| 2015/0180959 A1 * | 6/2015 | Bloch | G06F 9/45533 709/217 |
| 2015/0229724 A1 * | 8/2015 | Ray | H04L 12/4641 370/352 |

(Continued)

*Primary Examiner* — Chirag G Shah
*Assistant Examiner* — Suk Jin Kang
(74) *Attorney, Agent, or Firm* — Staniford Tomita LLP

(57) ABSTRACT

Embodiments are directed to a process and system for optimizing traffic paths for orphaned hosts in a VXLAN system, by configuring virtual link trunking (VLT) peers to advertise MAC addresses learned from all multi-homed hosts in the system using Anycast VXLAN tunnel endpoint-Internet Protocol address (VTEP-IP); configuring the virtual link trunking (VLT) peers to advertise MAC addresses learned from all single-homed hosts in the system using a secondary VTEP-IP; directing unicast traffic destined to the single-homed hosts to directly connected VLT peers using the Secondary VTEP-IP; and directing Broadcast, unknown unicast, and multi-cast (BUM) traffic destined to the single-homed hosts to directly connected VLT peers using the Inclusive Multicast Ethernet Tag route.

18 Claims, 10 Drawing Sheets

(56) References Cited

U.S. PATENT DOCUMENTS

| | | | |
|---|---|---|---|
| 2015/0280928 A1* | 10/2015 | Tessmer | H04L 12/4641 |
| | | | 370/390 |
| 2015/0381484 A1* | 12/2015 | Hira | H04L 45/64 |
| | | | 370/390 |
| 2016/0285761 A1* | 9/2016 | Dong | H04L 12/4666 |
| 2017/0093618 A1* | 3/2017 | Chanda | H04L 41/0803 |
| 2017/0093636 A1* | 3/2017 | Chanda | H04L 41/0803 |
| 2017/0118044 A1* | 4/2017 | Ray | H04L 12/4641 |
| 2017/0149583 A1* | 5/2017 | Hira | H04L 45/64 |
| 2017/0180323 A1* | 6/2017 | Wanser | H04L 63/10 |
| 2017/0207929 A1* | 7/2017 | Qian | H04L 12/4633 |
| 2017/0214619 A1* | 7/2017 | Chu | H04L 45/22 |
| 2017/0289033 A1* | 10/2017 | Singh | H04L 61/103 |
| 2017/0310582 A1* | 10/2017 | Anand | H04L 45/306 |
| 2017/0317919 A1* | 11/2017 | Fernando | H04L 45/16 |
| 2017/0331720 A1* | 11/2017 | Brissette | H04L 45/04 |
| 2017/0339052 A1* | 11/2017 | Arora | H04L 12/4641 |
| 2017/0346645 A1* | 11/2017 | Kotalwar | H04L 12/18 |
| 2018/0034648 A1* | 2/2018 | Nagarajan | H04L 67/1038 |
| 2018/0048478 A1* | 2/2018 | Tessmer | H04L 12/4641 |
| 2018/0109436 A1* | 4/2018 | Sajassi | H04L 45/28 |
| 2018/0109444 A1* | 4/2018 | Sajassi | H04L 45/28 |
| 2018/0131610 A1* | 5/2018 | Dong | H04L 12/4666 |
| 2018/0219773 A1* | 8/2018 | Li | H04L 45/64 |
| 2018/0227135 A1* | 8/2018 | Drake | H04L 45/16 |
| 2018/0241622 A1* | 8/2018 | Chanda | H04L 41/0803 |
| 2018/0248803 A1* | 8/2018 | Nagarajan | H04L 45/28 |
| 2018/0287946 A1* | 10/2018 | Nagarajan | H04L 47/15 |
| 2018/0302271 A1* | 10/2018 | Liu | H04L 41/0677 |
| 2018/0302321 A1* | 10/2018 | Manthiramoorthy | H04L 45/48 |

* cited by examiner

OPTIMIZING TRAFFIC PATHS TO ORPHANED HOSTS IN VXLAN NETWORKS USING VIRTUAL LINK TRUNKING-BASED MULTI-HOMING

TECHNICAL FIELD

Embodiments are generally directed to virtual extensible LAN (VXLAN) networks, and more specifically to optimizing traffic paths to single-homed hosts in VXLAN networks.

BACKGROUND

Ethernet VPN (EVPN) uses the Border Gateway Protocol (BGP) as control-plane for MAC address signaling and learning in data center fabric networks, as well as for access topology and VPN (virtual private network) endpoint discovery. Such networks typically comprise core switches that connect interconnect servers, and edge switches that connect client devices to the network. For network access using native Ethernet frames, the core would have the frames encapsulated with a VXLAN header, with a control plane running between devices interconnected by the core. EVPN expands current existing Virtual Private LAN Services offerings by using control-plane based MAC learning over the core. In EVPN networks, a software MAC address table is maintained in the firmware of network switches and/or other router devices. This MAC address table contains the MAC addresses learned on all the interfaces of routers and Ethernet access switches. Dynamic MAC address learning occurs when the bridging data path encounters an ingress frame whose source address is not present in the MAC address table for the ingress service instance. In EVPN, the system learns addresses on access interfaces, and uses a protocol, such as BGP, to learn addresses of the access interfaces on other switches in the network.

The Border Gateway Protocol (BGP) is a standardized exterior gateway protocol designed to exchange routing and reachability information among autonomous systems on the Internet. BGP makes routing decisions based on paths, network policies, or rule-sets configured by a network administrator. Internet Service Providers (ISP) use BGP to establish routing between one another and very large private IP (Internet Protocol) networks may use BGP internally. BGP neighbors are called peers, and are established by manual configuration between routers using TCP as the transport protocol.

EVPN enables users to connect different customer sites at layer 2; in other words, frames are forwarded between customer sites based on the contents of the layer 2 header. The VXLAN (virtual extensible LAN) overlay allows the network to stretch layer 2 connections over intervening layer 3 networks, thus providing for network segmentation without VLAN scaling limitations. VXLAN is virtualization technology that was developed to address the scalability problems associated with large cloud computing systems, thus EVPN with VXLAN encapsulation handles layer 2 connectivity at the scale required by cloud service providers. Virtual link trunking (VLT) was developed by Dell Networking to allow users to set up an aggregated link towards two different switches by making them appear logically as a single switch to the peer, where a standard aggregated link can only terminate on a single switch. It is a layer-2 link aggregation protocol between end-devices (servers) connected to different access-switches, offering these servers a redundant, load-balancing connection to the core-network in a loop-free environment. VLT can also be run between switches, such as between an access switch and multiple core switches.

In BGP-EVPN, when VLT is used to provide multi-homing for customer hosts, it is possible that traffic destined to the orphaned (single-homed) hosts which are connected to VLT peers might take a sub-optimal path. It would be advantageous to avoid these sub-optimal paths to the orphaned hosts. It would also be advantageous to provide a method that determines how the unicast and multicast traffic is delivered to multi-homed and orphaned hosts in a VLT domain.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
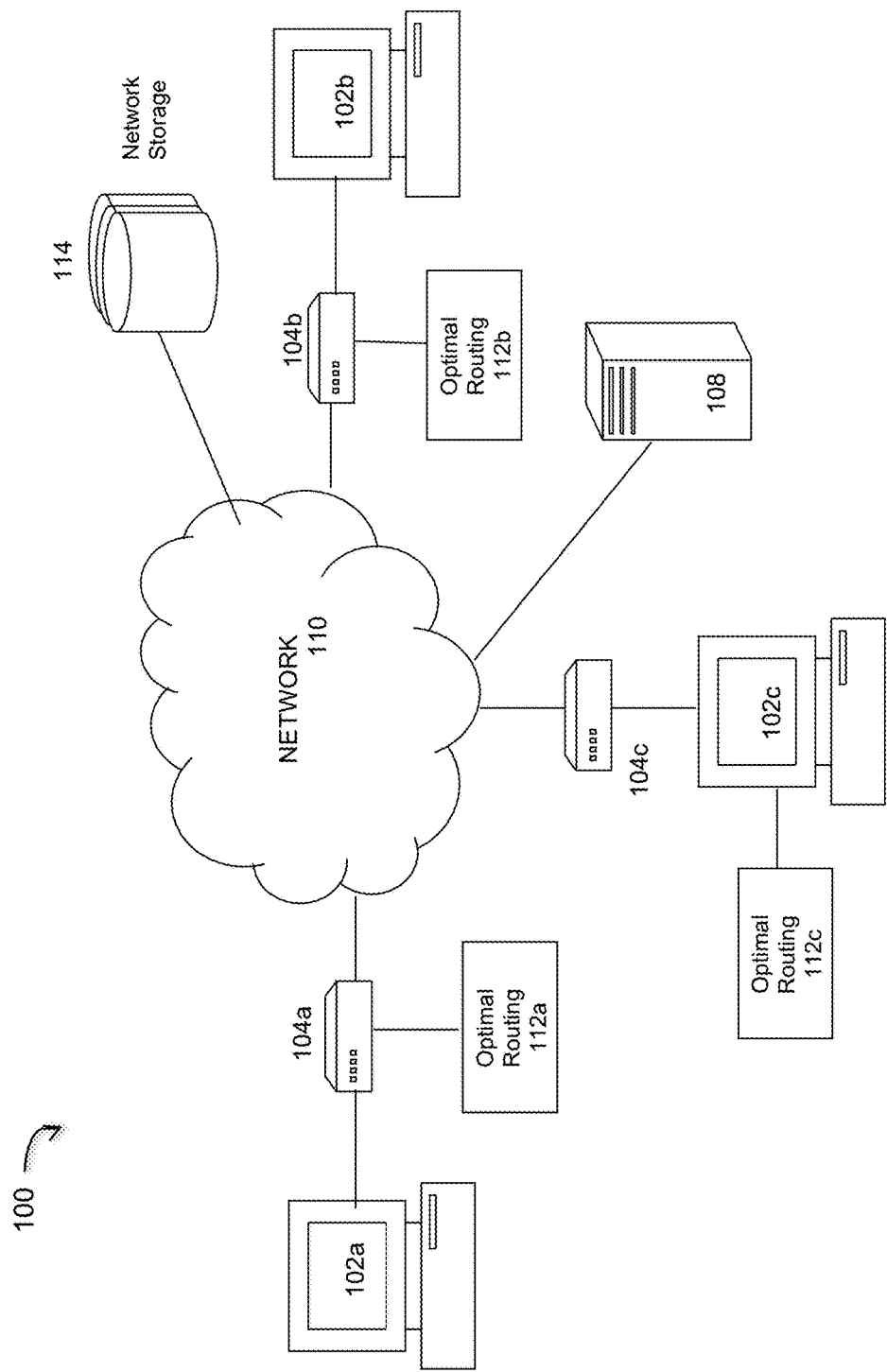
FIG. 1 is a diagram of a computing network implementing a network tuning process for large-scale data transfers, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard-coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve network coding implementation in a very large-scale wide area network (WAN), metropolitan area network (MAN), cloud, or similar distributed network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer networks and/or data centers.

Embodiments are directed to a method of avoiding sub-optimal paths for single-homed hosts in a VXLAN networks. FIG. 1 illustrates a computer network system that implements one or more embodiments of an Internet Protocol (IP) network implementing a routing process that minimizes sub-optimal path routing to orphaned hosts. In system 100, a number of computers 102a-c are connected to each other over a network 110. The network 110 may represent part of the Internet network that represents a public network (WAN or MAN) that is accessed by users through one or more Internet Service Providers (ISPs). Depending on the application and direction of data traffic, one or more computers 102 may be referred to, or function as hosts, and others may function as targets, though embodiments are not so limited and other terms may be used.

The computers 102a-c may represent individual computers operated by individuals or computers that are part of their own private network (LAN) that execute applications using data provided by other resources on the network 110, such as from other computers 102, data sources 114, or other network servers 108. Network 110 provides connectivity to the various systems, components, and resources of system 100, and may be implemented using protocols such as Transmission Control Protocol (TCP) and/or Internet Protocol (IP), well known in the relevant arts. In a cloud computing environment, for example, network 110 represents a network in which applications, servers and data are maintained and provided through a centralized cloud computing platform.

In an embodiment of system 100, the computers 102a-c are coupled to network 100 through respective interface devices 104a-c. These devices may be embodied as a network switch (e.g., switching hub or bridging hub). In a hardware embodiment, the switch electrically and logically connects together the devices in the system. Multiple data cables are plugged into a switch to enable communication between different networked devices. Switches manage the flow of data across a network by transmitting a received network packet only to the one or more devices for which the packet is intended. Each networked device connected to a switch can be identified by its network address, allowing the switch to regulate the flow of traffic. This maximizes the security and efficiency of the network.

Unless otherwise specified, the terms "router" and "switch" may be used interchangeably to mean a network interface device that connects a host computer to the network, and may represent a switching hub embodied in or as a provider edge (PE) or customer edge (CE) device. In certain cases, hosts can be directly connected to PEs. In other cases, hosts may reside behind a network and connect into the PE through a CE switch. Embodiments are directed to multi-homed connectivity to the PE that could be either of a multi-homed host or a multi-homed CE switch.

In an Ethernet-based network, each device in the network is identified by a unique network address, which in an embodiment is a media access control (MAC) address. Generally, a MAC address is a unique identifier assigned to network interfaces for communications at the data link layer of a network segment. MAC addresses are most often assigned by the manufacturer of a network interface controller (NIC) and are stored in its hardware, such as the card's ROM (read-only memory) or firmware. A network node may have multiple NICs and each NIC must have a unique MAC address. Certain multilayer switches or routers may require one or more permanently assigned MAC addresses. The switch 104 uses packet switching to receive, process, and forward data to the respective destination device 102. The network switch is a multiport network bridge that uses hardware addresses to process and forward data at the data link layer (layer 2) of the OSI model so, unlike simple network hubs, the network switch forwards data only to the devices that need to receive it, rather than broadcasting the same data out of each of its ports. Some switches can also process data at the network layer (layer 3) by additionally incorporating routing functionality that most commonly uses IP addresses to perform packet forwarding; such switches are commonly known as layer-3 switches or multilayer switches. In an embodiment, switches 104*a-c* may be layer 2 or layer 3 network switches or the equivalent router or other interface device.

It should be noted that network system 100 of FIG. 1 is provided as an example only and any number of computers, servers 108, and other resources may be provided. In addition, one or more computers in system 100 may be virtual machines supported by virtualization technology (e.g., hypervisors). Any number of virtual machines (VMs) or groups of VMs (e.g., organized into virtual centers) may be provided to serve as data sources or targets, such as for backup operations.

In an embodiment, system 100 implements Ethernet VPN (EVPN) technology to provide a wide range of data interconnection services and organize the control plane separately from the data plane. In general, the control plane makes decisions about where network traffic is sent, while the data plane actually moves the packets based on what is learnt in the control plane. Control plane packets are sent to or originated by the router or switch itself. The control plane functions include the system configuration, management, and exchange of routing table information, and the interface hardware exchanges the topology information with other routers and constructs a routing table based on a routing protocol, such as BGP. Control plane packets are processed by the router to update the routing table information, thus representing the signaling functions of the network. The data plane (or "forwarding plane") forwards traffic to the next hop along the path to the selected destination network according to control plane logic. Data plane packets go through the router, and the routers/switches use what the control plane built to dispose of incoming and outgoing frames and packets.

EVPN technology also supports VXLAN, and system 100 uses a VXLAN-like encapsulation technique to encapsulate MAC-based Ethernet frames within UDP packets endpoints, that terminate VXLAN tunnels and may be both virtual or physical switch ports 104, are known as VXLAN tunnel endpoints (VTEPs). The terms VTEP and PE may refer to the same edge device entity depending on the technology being used.

In an embodiment, system 100 includes processes and components that help prevent, avoid, or minimize suboptimal path routing in border gateway protocol (BGP) EVPN networks using VLT multi-homing mechanisms. Such processes or components may be implemented through optimal routing software or firmware components 112*a-c* executed by or within respective switch devices 104*a-c*, as shown in FIG. 1. This functionality may be executed within each switch 104 associated with a computer 102 or only one or some of the switches.

Embodiments apply to VXLAN networks implementing BGP-EVPN for certain multi-homing mechanisms. As is known, VXLAN provides mechanisms to aggregate and tunnel multiple layer 2 Ethernet sub-networks across a layer 3 infrastructure. This allows VMs on different networks to communicate as if they were in the same layer 2 subnet. Technically, VXLAN uses a VXLAN-like encapsulation technique to encapsulate MAC-based OSI layer 2 Ethernet frames within layer 3 UDP packets. VXLAN endpoints, which terminate VXLAN tunnels and may be both virtual or physical switches, are known as VXLAN tunnel endpoints (VTEPs).

In EVPN networks, service traffic is tunneled over a packet network such as MPLS or IP and so-called "BUM" (broadcast, unknown unicast and multicast) traffic is supported. Remote MAC addresses are learnt using a control-plane protocol (MP-BGP) but local MAC addresses continue to be learnt using standard IEEE procedures. A customer edge device (CE) treats multiple links connected to PEs as a LAG (link aggregation). EVPN offers two operating modes: single-homing, which enables connection between a customer edge (CE) device to one provider edge (PE) device; and multi-homing, which enables connection between a CE device to multiple PE devices. In EVPN multihoming scenarios, certain route types (e.g., auto-discover, forwarder, etc.) are advertised to discover other PEs. When customer traffic arrives at the PE, EVPN MAC advertisement routes distribute reachability information over the core for each customer MAC address learned on local Ethernet segments. Each EVPN MAC route announces the customer MAC address and the Ethernet segment associated with the port where the MAC was learned from and its associated VNID (virtual network ID). This EVPN VNID is used later by remote PEs when sending traffic destined to the advertised MAC address. In this context, MAC learning is the process of obtaining the MAC addresses of all the nodes (e.g., hosts or end stations) on a network, when a node is first connected to an Ethernet LAN or VLAN. In MAC learning, as data is sent through the network, data packets include a data frame header listing their source and destination MAC addresses, and optionally a VLAN tag. The data frame is forwarded to a target port, which is connected to the second device. The MAC address is learned locally at the source port, which facilitates communications for frames that later enter the target port (or any other port on the switch) and contain addresses previously learned from a received frame.

Figure 2A:
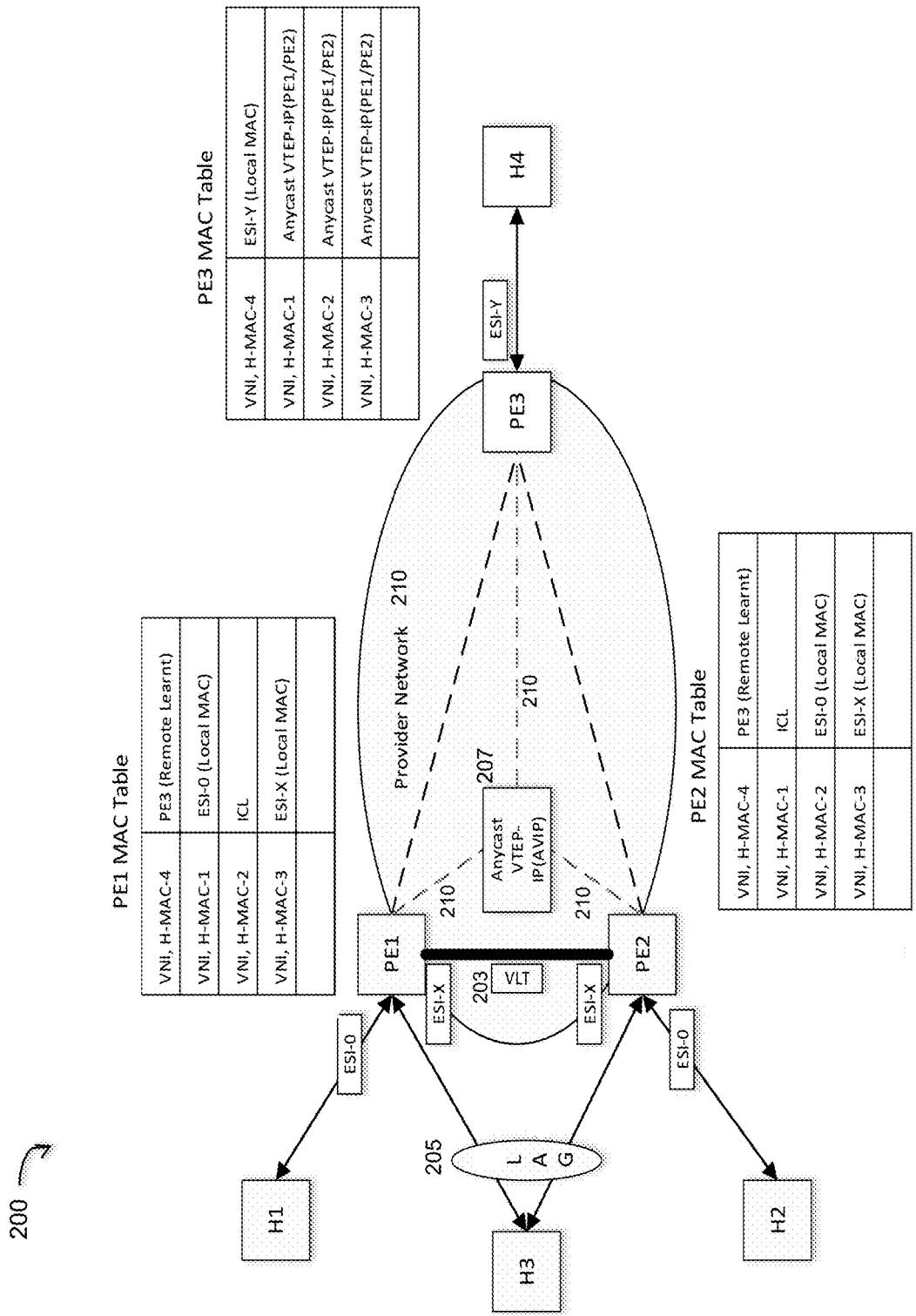
FIG. 2A illustrates a reference Ethernet VPN network that implements a failure recovery process with continuous network operation, under some embodiments.

FIG. 2A illustrates a reference EVPN network that implements a suboptimal path avoidance process for single-homed hosts in a VLT system, under some embodiments. System 200 depicts a Layer 2 Ethernet VPN, where customers attach through host computers H1, H2, H3, and H4 to the provider network 210 through the provider edge devices (PE), denoted in FIG. 2A as PE1 to PE3. A provider edge device (PE router) is an edge router participating in the VPN, typically between one ISP's area and areas administered by other network providers. The PE is capable of supporting a broad range of routing protocols including the Border Gateway Protocol (BGP) that controls PE to PE, or PE to CE communication, where the customer edge (CE) device is the router at the customer premises that is connected to the provider edge of a service provider IP network. The provider network 210 uses VXLAN tunneling between the PEs with IP routing as underlay for packet forwarding in the data-plane. In an embodiment, the PEs run BGP-EVPN (e.g., as per RFC 7432 and draft-ietf-bess-evpn-overlay) in the control-plane to communicate and distribute information with each other. It should be noted that hosts can also be connected directly to the PEs without a CE. For purposes of illustration, a host (H) and CE are used interchangeably and are illustrated as hosts H1 to H4.

For communication across the network 210, the MAC addresses of the customer devices must be learned by the provider edge devices and then advertised using BGP to the other provider edge devices. For the embodiment of FIG. 2A, each PE learns about the MAC addresses in its local customer network using data-plane MAC learning from incoming packets. These MAC addresses are then advertised to all the PEs in the EVPN using the new BGP EVPN NLRI (MAC/IP Advertisement Route). The remote PEs in-turn install these MAC addresses as static MAC addresses pointing to the VXLAN tunnel corresponding to the PE that generated the BGP EVPN MAC route, in their data-plane MAC tables. All PEs to which a CE is multi-homed are called multi-homed peers. Each multi-homed peer independently learns the customer MAC address using data-plane MAC learning. Due to certain packet hashing operations, a given multi-homed PE may learn only a subset of the customer MAC addresses directly using data-plane MAC learning; it then learns the rest of the MAC addresses from the BGP EVPN control-plane. All PEs multi-homed to a CE use the same Ethernet Segment Identifier (ESI) to denote the link connecting the PE to the CE. Thus, as shown in FIG. 2A, PE1 and PE2 use ESI-X to connect to H3, and PE3 uses ESI-Y to connect to H4. A PE can determine whether a given MAC address is reachable locally and/or via remote PEs using the ESI advertised for the MAC in the BGP EVPN route.

System 200 depicts a provider network where each PE is part of an EVPN (Ethernet VPN) instance. The hosts/CEs that are connected to these PEs are either multi-homed or single-homed (i.e., orphaned). The PEs are connected by an IP infrastructure, with a VXLAN (Virtual Extensible Local Area Network) tunneling mechanism. In the example of FIG. 2, the PE pair PE1-PE2 are providing multi-homing via VLT link aggregation. The other PEs are reachable via any IGP routing protocol and participate in BGP EVPN procedures. In an embodiment, the hosts/CEs are multi-homed at the PEs via LAG component 205, or any other VLT-like mechanism. As illustrated, LAG 205 represents certain link aggregation (LAG) mechanisms may be used to implement multi-homing. One such mechanism is VLT (Virtual Link Trunking), which is provided for switches from Dell Networking.

All of the locally learnt MAC addresses at each PE are advertised by the MP-BGP protocol to either a BGP-RR or to all the peers in the network using BGP-EVPN based route advertisements. FIG. 1 shows associated MAC tables for each respective PE, i.e., PE1 has the PE1 MAC table, PE2 has the PE2 MAC table, and PE3 has the PE3 MAC table.

The provider edge devices PE1 and PE2 will use same Anycast IP address as the source VTEP-IP for VXLAN Tunnels to different PEs. In FIG. 2A, the dashed line 210 in provider network represents VXLAN traffic to/from the Anycast VTEP IP (AVIP) address mechanism 207. Using this mechanism, PE1 and PE2 will advertise MAC addresses learnt from the hosts (either multi-homed or orphaned) connected to them to all the BGP peer with the Anycast IP address as the next hop in their BGP-EVPN MAC/IP route advertisements. PE3 would then program its forwarding database (FDB) with these routes pointing to the Anycast IP address. If host H4 sends traffic to host H1, PE3 can forward the traffic to either PE1 or PE2, since the BGP-EVPN MAC/IP advertisement for H1 will only carry Anycast VTEP-IP as the next-hop to reach H1. So, if the traffic from PE3 destined to H1 lands on PE2, this will result in the traffic being forwarded over the Inter Chassis Link (ICL) between PE1 and PE2 to reach PE1 and is then forwarded to the Host H1. Even though there is an optimal path (H4→PE3→PE1→H1) present, the traffic towards the orphaned host H1 could end up taking a suboptimal path (H4→PE3→PE2→PE1→H1).

In general, an Anycast IP address represents an address generated by a networking technique where the same IP prefix is advertised from multiple locations. Anycast addressing is thus a one-to-one-of-many association where datagrams are routed to any single member of a group of potential receivers that are all identified by the same destination address. The routing algorithm selects the single receiver from the group based on which is the nearest according to some distance measure. As used herein, and Anycast address may be generated by any appropriate protocol or mechanism, such as that supported explicitly in IPV6, or any similar system.

Figure 2B:
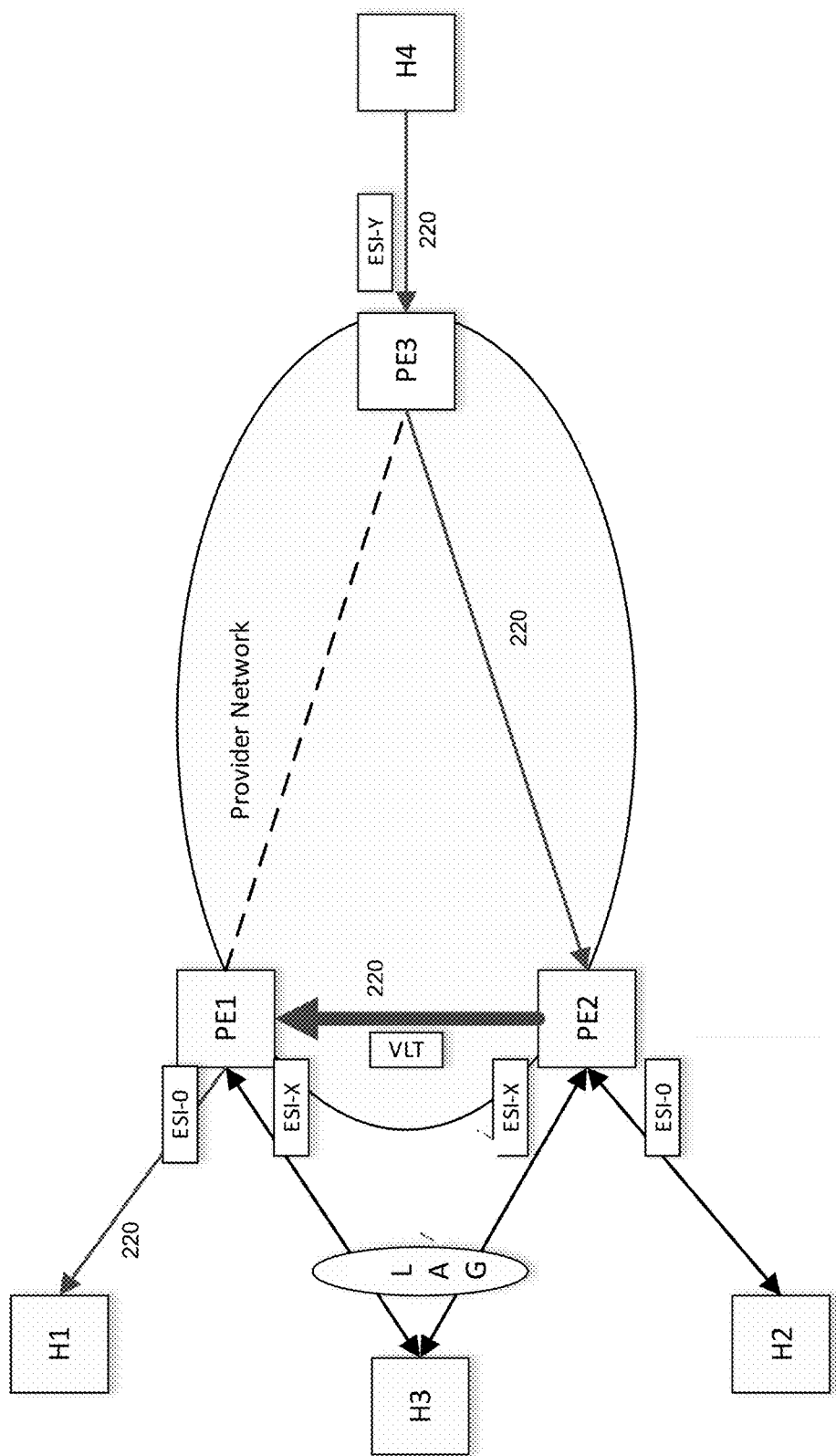
FIG. 2B shows the network 200 of FIG. 2A with the suboptimal paths to host H1 illustrated in an example case.

FIG. 2B shows the network 200 of FIG. 2A with the suboptimal paths to host H1 illustrated in an example case. In this example, the suboptimal path described above is illustrated as a route with link segments 220 between host H2 and H1. The suboptimal path situation shown in FIG. 2B is rectified by an optimal path method that makes the provider edge devices PE1, PE2, PE3 part of the same EVPN instance (EVI). In an embodiment, this is implemented through a second, unique (i.e., not Anycast) VTEP-IP address that is assigned to each PE that is part of the VLT. In other words, PE1 and PE2 are each assigned a second, unique VTEP-IP address, in addition to the common Anycast VTEP-IP address that is shared by them.

Figure 3:
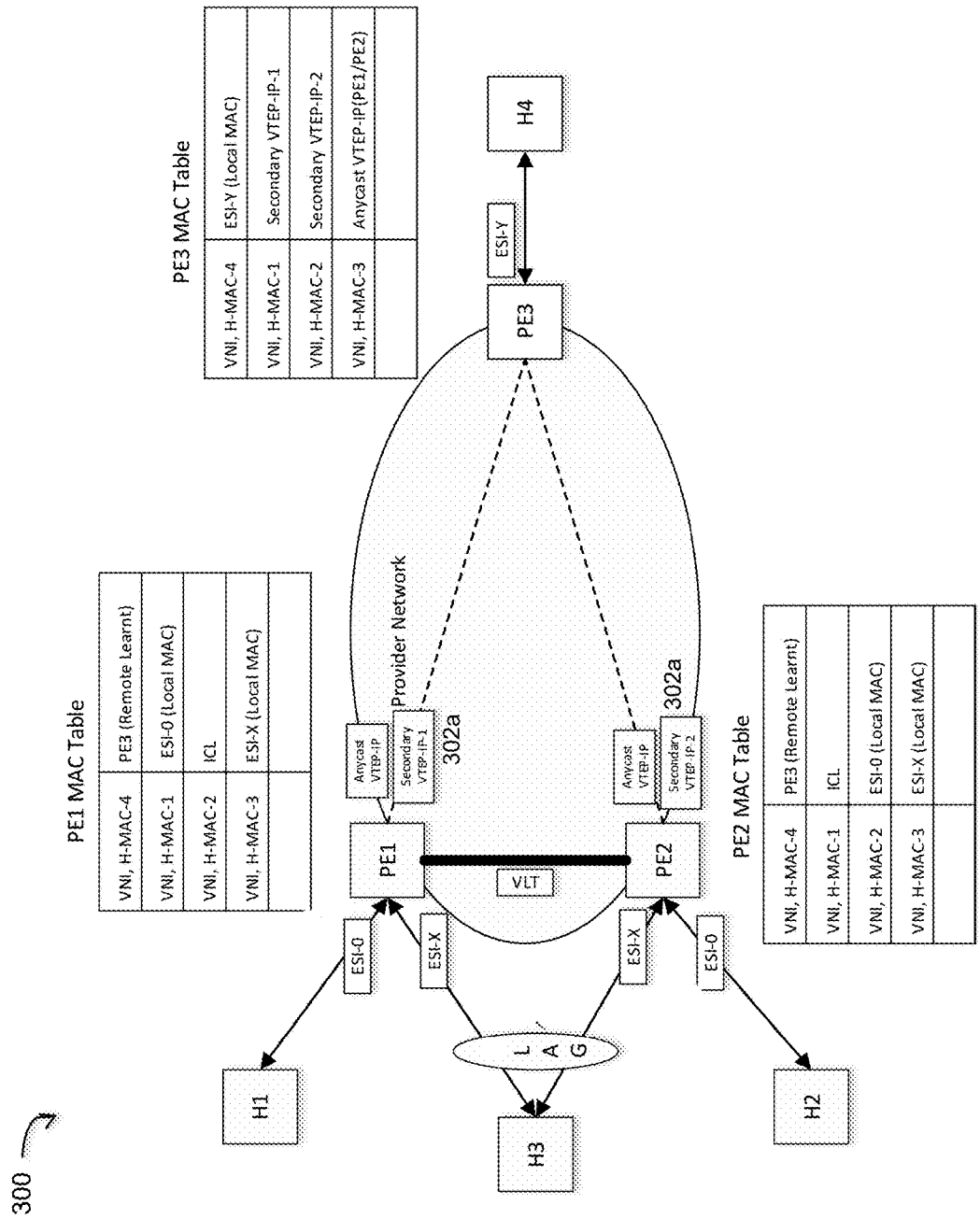
FIG. 3 illustrates the network of FIG. 2A with an EVPN setup in which the provider edge devices are part of the same EVPN instance, under an embodiment.

FIG. 3 illustrates the network of FIG. 2A with an EVPN setup in which the provider edge devices are part of the same EVPN instance, under an embodiment. As shown in system 300 of FIG. 3, PE1 and PE2 are VLT Peers and provide the multi-homing to the host H3, while hosts H1 and H2 are the orphaned hosts connected to PE1 and PE2 respectively. Hosts H1 and H2 are connected to Ethernet Segment 0 (Reserved ES) while host H3 would use a non-reserved Ethernet Segment. All of these Ethernet Segments are part of the same bridge domain or logical network (VNI). PE1 and PE2 are configured with an Anycast VTEP-IP to advertise the MAC addresses learned from all the multi-homed hosts (e.g., H3). PE1 and PE2 will be independently configured with a secondary VTEP-IP 302a or 302b to advertise the MAC addresses learned from the orphaned hosts. With this secondary VTEP-IP mechanism, traffic destined to the orphaned hosts will be directed to the PEs which are attached to the orphaned hosts. This avoids the traffic taking sub-optimal paths, such as illustrated in FIG. 2B.

As shown in FIG. 3, each provider edge device in network 300 has a respective associated MAC address table. Thus, PE1 has a PE1 MAC address table, PE2 has a PE2 MAC address table, and PE3 has a PE3 MAC address table. These tables are shown with certain example entries. As shown for the PE2 MAC address table, the VNI MAC-H4 is installed as the local MAC address ESI-Y, the VNI MAC-H1 address is set to the secondary VTEP-IP-1, and the MAC-H2 address is set to the secondary VTEP-IP-2, while the MAC-H3 is set to the Anycast VTEP-IP. The other MAC tables (for PE1 and PE2), are populated with values according to the example network shown.

In an embodiment, remote MAC learning on the network-facing ports is disabled on all the participating PEs as the remote MAC addresses are published by control plane protocol (BGP-EVPN). The method of assignment and managing of the Anycast VTEP-IP and a secondary VTEP-IP to the VLT peers is performed through a dynamic VTEP-IP allocation scheme for VLT peers, which is explained in greater detail in a separate section below.

With regard to route advertisements, namely MAC/IP advertisements, PEs connected to the orphaned hosts/CEs will use a secondary VTEP-IP (other than the existing Anycast VTEP-IP) to advertise the MAC addresses learned from orphaned hosts using the BGP-EVPN's MAC/IP advertisement. This will make the remote PEs learn the orphaned hosts as reachable by the actual PEs that are hosting them so that traffic destined to these orphaned hosts will directly land on these PEs. This eliminates the sub-optimal paths to reach the orphaned hosts.

For an inclusive multicast Ethernet tag route, in a given EVI, each PE that wants to receive Broadcast, Unknown Unicast and Multicast (BUM) traffic, an inclusive multicast Ethernet tag EVPN route is set for the EVPN bridge domain. In a current scenario (such as illustrated in FIG. 3), PE1 and PE2 would advertise this route with Anycast VTEP-IP. They should not use the secondary VTEP-IP for these advertisements. This ensures that only one copy of the BUM traffic is received to PEs hosting both multi-homed and orphaned hosts. Any BUM traffic destined to PE1 or PE2, would be flooded to the local Ethernet Segments attached to those PEs. If a PE is participating in a VLT Domain and the EVI that the PE is part of is not present in its VLT peers, it should use a non-Anycast VTEP-IP to advertise the inclusive multicast Ethernet tag route. For example, if PE1 and PE2 are VLT peers, and only PE1, PE3 are participating in an EVI (e.g., EVI-10), PE1 would use the non-Anycast VTEP-IP to advertise the inclusive multicast Ethernet tag route. It should not use the Anycast VTEP-IP that is assigned for the {PE1, PE2} group as the EVI-10 is not present in the VLT peer PE2.

Figure 4A:
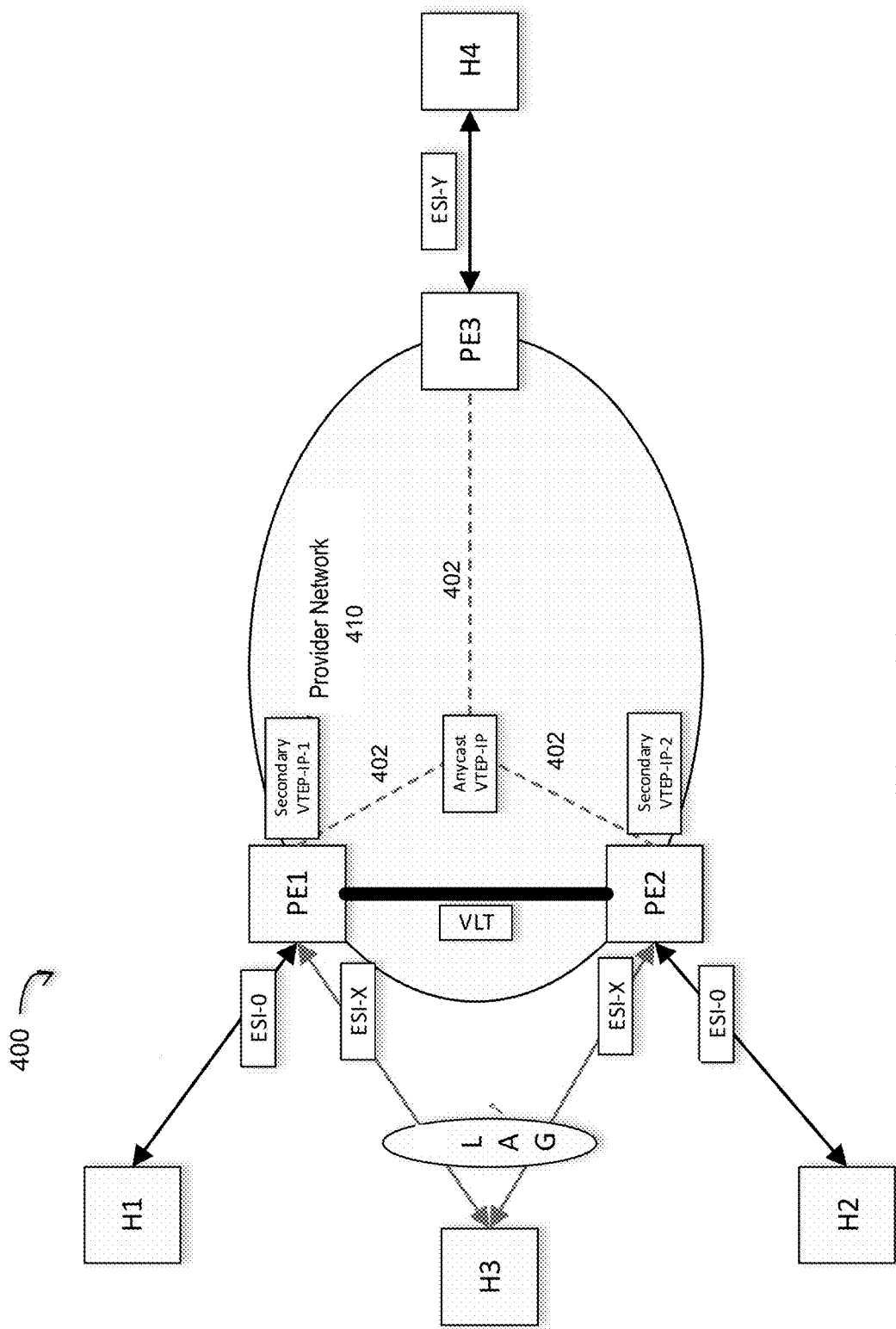
FIG. 4A illustrates example unicast traffic flows to/from a multi-homed host for the network of FIG. 3, under an embodiment.

Traffic flow in the example network of FIG. 3 can be unicast or multicast and for unicast traffic it can be to/from a multi-homed host or an orphaned host. FIG. 4A illustrates example unicast traffic flows to/from a multi-homed host for the network of FIG. 3, under an embodiment. For this example, in system 400, traffic along the route with links 402 within provider network 410 represents traffic to and from multi-homed host H3. In this embodiment, traffic originating from multi-homed hosts (e.g., H3) would be encapsulated into a VXLAN packet with source VTEP-IP as the Anycast VTEP-IP at either of the VLT peers (e.g., PE1 or PE2) and sent towards the destination VTEP; and traffic Destined towards the multi-homed hosts would carry the destination VTEP-IP as the Anycast VTEP-IP, and this traffic can land on either of the VLT peers.

Figure 4B:
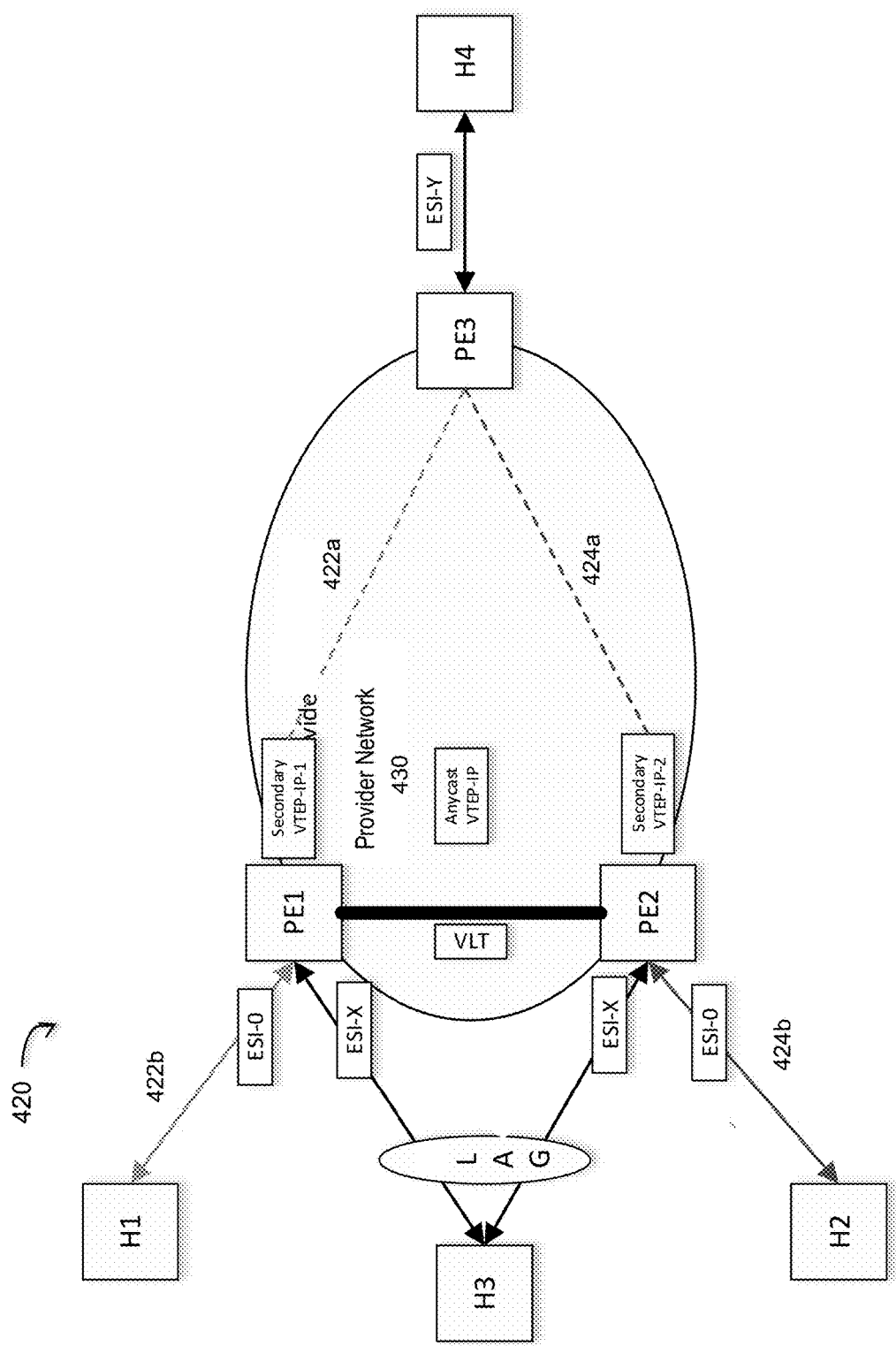
FIG. 4B illustrates example unicast traffic flows to/from a single-homed host for the network of FIG. 3, under an embodiment.

FIG. 4B illustrates example unicast traffic flows to/from a single-homed host for the network of FIG. 3, under an embodiment. In this example, dashed lines 422a and 424a in provider network 430 represents VXLAN traffic to and from orphaned hosts H1 and H2, which travel over links 422b and 424b outside of the provider network. Traffic originated from the orphaned hosts (H1 or H2) would be encapsulated into a VXLAN packet with source VTEP-IP as the secondary VTEP-IP assigned to handle all the traffic to/from orphaned hosts and sent towards the destination VTEP. Traffic destined towards the orphaned hosts would carry the destination VTEP-IP as the secondary VTEP-IP, which was used to advertise the MAC addresses learned from the orphaned hosts. This traffic will actually be directed to the PEs which are connected to the orphaned hosts.

For BUM traffic, a VLT peer could receive traffic from multi-homed hosts, orphaned hosts, or remote VTEPs. In the case of a VLT peer receiving BUM traffic from multi-homed hosts, the traffic would be ingress replicated towards all the remote VTEP endpoints which have advertised the "Inclusive Multicast Ethernet Tag Route" within the EVI. Traffic would be flooded onto all the locally attached Ethernet segments for that EVI as well, and this traffic will be flooded towards the orphaned hosts and towards the VLT peer (via ICL). If a VLT peer receives BUM traffic on the ICL, it has to flood that traffic onto all the locally attached Ethernet Segments for that EVI. This will include the multi-homed hosts, from where the BUM traffic originates, which will cause duplication of traffic at the receiving multi-homed host. To avoid this, BUM traffic received on the ICL should not be flooded to multi-homed hosts. A VLT peer receiving the BUM traffic on ICL should not flood traffic towards the network, since the originating VLT peer would flood the traffic towards the network. The receiving VLT peer should only flood traffic towards its locally connected segments. A VLT Peer receiving BUM traffic from an orphaned host would follow these same rules.

In the case of a VLT peer receiving BUM Traffic from Remote VTEPs, as both the VLT peers would advertise "Inclusive Multicast Ethernet Tag Route" using the same Anycast VTEP-IP, the BUM traffic from the remote VTEP endpoints would be directed to either of the VLT peers. The VLT peers receiving the BUM traffic from the remote VTEP endpoint would flood the traffic on the all the locally attached Ethernet Segments for that EVI. This will include multi-homed hosts and orphaned hosts as well. The VLT peers would also flood the traffic onto the ICL as well. A VLT peer receiving the BUM traffic on ICL would flood the traffic on the all the locally attached Ethernet Segments for that EVI. A VLT peer receiving the BUM traffic on ICL, should not flood towards the network as the originating VLT peer, as it received the BUM from the remote VTEP endpoints.

Dynamic VTEP-IP Allocation Scheme

Figure 5:
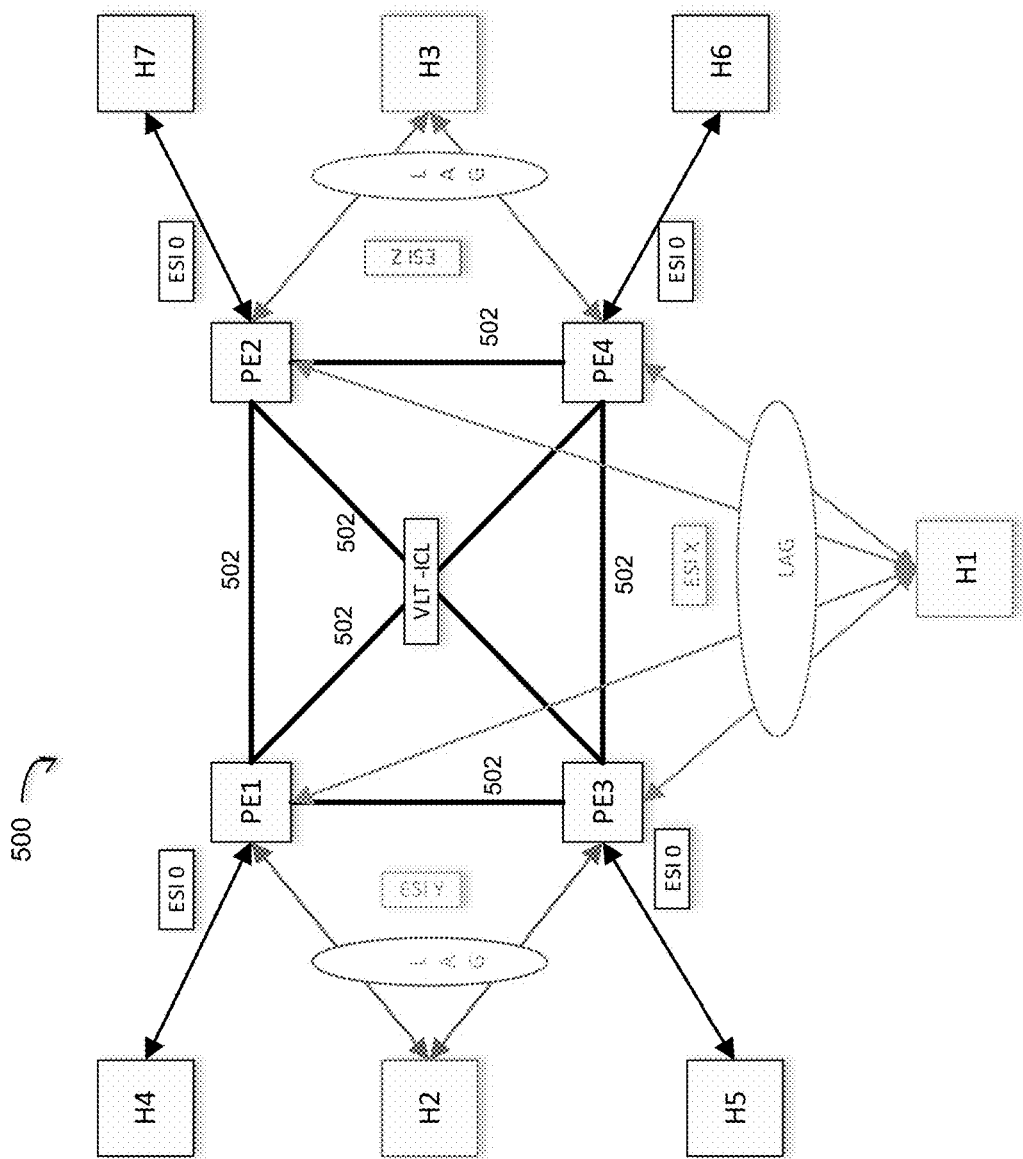
FIG. 5 illustrates a multi-node VLT network with multi-homed hosts implementing a dynamic VTEP-IP allocation scheme, under some embodiments.

As stated above, the method of assignment and managing of the Anycast VTEP-IP and a secondary VTEP-IP to the VLT peers, as shown in FIG. 3, is performed through a dynamic VTEP-IP allocation scheme for VLT peers. FIG. 5 illustrates an n-node VLT network with multi-homed hosts implementing a dynamic VTEP-IP allocation scheme, under some embodiments. An n-node VLT (n>=2) domain can have hosts multi-homed to either a subset of VLT nodes or to all the VLT nodes in that domain. Correspondingly, the Ethernet Segments of these hosts are attached to either all of the VLT nodes or subset of them. As shown in system 500 of FIG. 5, host H1 is attached to Ethernet Segment ESI-X, which is multi-homed at all the PEs in the VLT domain. While hosts H2 and H3 are attached to Ethernet Segments ESI-Y and ESI-Z and are respectively multi-homed at PE and PE3, and PE2 and PE4. Hosts H4, H5, H6 and H7 are attached to non-multihomed (orphaned) Ethernet segments. The lines 502 that connect the PEs to one another represent VLT connectivity.

As described above, to avoid sub-optimal paths for the traffic destined to orphaned hosts, an optimum traffic process establishes different VTEP-IPs that are used to advertise the MAC addresses learned from the hosts; these are the Anycast VTEP-IP for the multihomed Ethernet Segments (Hosts) and Secondary VTEP-IP for the non-multihomed Ethernet Segments (hosts).

In addition, an EVI can span across all the VLT peers, a subset of VLT peers, or on a single VLT Node. Therefore, the Inclusive Multicast Ethernet Tag Route advertisement has to carry an IP address that properly represents VLT plus EVI domains. In an embodiment, the optimum routing process includes a scheme that identifies how many possible subsets of VLT nodes can exist to multi-home various Ethernet Segments. It also identifies each such subset and assigns an Anycast VTEP-IP to advertise the MAC addresses learnt from the multi-homed Ethernet Segments. This scheme must also identify in a given VLT Domain, the EVIs configured across all VLT peers or a subset of VLT peers and choose a proper IP address that properly represents the VLT plus EVI combination to advertise the inclusive multicast route.

To describe the scheme that properly represents VLT plus EVI domains under an embodiment, consider a case where there are n-nodes in a VLT domain. There could thus be $(2^n-1)-n$ subsets of VLT node combinations. For example, if a VLT domain has three nodes A, B and C, it can have four combinations of VLT subsets (i.e., AB, BC, CA, and ABC).

With this scheme, in an n-node VLT domain, each VLT peer will be configured with an identical set of $(2^n-n-1)$ IP addresses to be used as the Anycast VTEP-IPs for all the possible VLT subsets. A VLT node that is designated to a primary node will take the task of identifying the VLT subset combinations and dispensing corresponding IP addresses to individual VLT nodes to use. Each VLT peer will keep track of the IP addresses assigned and being used. The IP address range will deplete as and when VLT nodes start joining the VLT domain. If there are more VLT nodes joining, than the allowed by the number of IP Addresses, and error condition results, and the system administrator or user can be alerted accordingly.

For example, in system 500 of FIG. 5, if PE1 becomes the VLT-Primary, it operates on a preconfigured IP address range and assigns the IP addresses corresponding to each possible VLT subset combination as shown in Table 1 and dispenses these pre-allocated IP addresses to each PE in that VLT domain.

TABLE 1

| VTEP Entity | Description |
|---|---|
| {PE1}<br>{PE2}<br>{PE3}<br>{PE4} | For non-multihomed Ethernet segments attached to each individual PEs. This is the secondary VTEP IP address. |
| {PE1, PE2}<br>{PE1, PE3}<br>{PE1, PE4}<br>{PE2, PE3}<br>{PE2, PE4}<br>{PE3, PE4}<br>{PE1, PE2, PE3}<br>{PE1, PE2, PE4}<br>{PE1, PE3, PE4}<br>{PE2, PE3, PE4} | For the Ethernet Segments multihomed at the subset of VLT nodes. Anycast addresses for these subsets is allocated from the set of $(2^n - n - 1)$ IP addresses configured on each VLT peer. |
| {PE1, PE2, PE3, PE4} | For the Ethernet segments multihomed at the all the VLT nodes in a given VLT domain. This is the normal Anycast address that would be used for multihoming. |

For example, PE3 will get IP address allocated for the combinations shown in Table 2 below:

TABLE 2

| VTEP Entity | Description |
|---|---|
| {PE3} | For non-multihomed Ethernet Segments attached to PE3 alone (Host H5). |
| {PE3, PE1},<br>{PE3, PE2},<br>{PE3, PE4},<br>{PE3, PE1, PE4},<br>{PE3, PE2, PE4},<br>{PE3, PE1, PE2}, | For the Ethernet Segments multihomed at the subset of VLT nodes, where PE3 is a member of the VLT subset. |
| {PE1, PE2, PE3, PE4} | For the Ethernet Segments multihomed at the all the VLT nodes in a given VLT domain (Host H1). |

In an example implementation, a table such as Table 1 would be generated by the primary PE and maintained in each of the PEs, and such a table may represent a subset of addresses in the system (e.g., only IP addresses that PE3 uses when advertising MAC addresses), and other address tables are also possible.

With regard to route advertisements, for a MAC/IP advertisement, as per the earlier description, the MAC addresses learned from the attached Ethernet Segments are advertised by a given PE either using one of the Anycast VTEP-IPs or its Secondary VTEP-IP based on the type of connectivity (either multi-homed or orphaned).

Table 3 is an example set of advertisements for MAC addresses of host H2 and host H5 advertised by PE3 for network 500.

TABLE 3

| MAC addresses learned from Host H1 | Advertised by the Anycast VTEP-IP assigned for the VLT Set {PE1, PE2, PE3 & PE4} |
|---|---|
| MAC addresses learned from Host H5 | Advertised by the Secondary VTEP-IP assigned only for {PE3} |

For a VLT node join, when a new PE joins the VLT Domain, the VLT primary will dispense the set of Anycast and secondary VTEP-IP addresses to be used for Multi-homed and orphaned traffic. If the newly joined PE is also attached to an Ethernet Segment (or EVI) that is also attached to one or more VLT peers in the same VLT domain, all the MAC addresses learnt on that Ethernet Segment need to be advertised with a new Anycast VTEP-IP assigned for the VLT subset combination. For example: assume that initially, PE1, PE3 and PE4 are attached to Ethernet Segment ESI-X. All the MAC addresses learnt from host H1 will be advertised with the Anycast VTEP-IP that was assigned for the VLT subset {PE1, PE3, PE4} as the next hop. Now, if PE2 also gets connected to the Ethernet Segment ESI-X, the MAC addresses learnt from H1 will be re-advertised with Anycast VTEP-IP assigned to the VLT set {PE1, PE2, PE3, PE4} as the next hop. PEs attached to the same Ethernet segment will treat this MAC advertisement as that of a local MAC address. PEs which are in the same VLT domain, but not part of the same Ethernet Segment, would treat this as the MAC address move and adjust their forwarding databases accordingly to point to the new Anycast VTEP-IP. PEs within the provider network, would also treat this as a MAC address move and adjust their forwarding databases accordingly.

When a PE splits from a given VLT domain and was multi-homing an Ethernet segment along with one or more VLT Peers, the VLT Peers in the resultant VLT subset would assume the Anycast VTEP-IP that was assigned for the surviving VLT subset and re-advertise all the MAC addresses learnt from the attached Ethernet segment with the new Anycast VTEP-IP as the next hop. For example, suppose Host H1 (ESI-X) is multi-homed to the VLT set (PE1, PE2, PE3, PE4). All the MAC addresses learnt from the Ethernet Segment ESI-X would be advertised by the Anycast VTEP-IP assigned for this VLT set. Now, if PE4 fails or splits from the VLT domain, the resultant VLT Domain {PE1, PE2, PE3} would re-advertise the MAC addresses learnt from the ESI-X with a new Anycast VTEP-IP assigned to the VLT set {PE1, PE2, PE3}.

For the Inclusive Multicast Ethernet Tag Route advertisement, consider an n-VLT topology as described in FIG. 5. In system 500, there are some hosts multi-homed to all the VLT peers and some of them multi-homed to a subset of VLT Peers. Table 4 below lists the IP address to be used to advertise the inclusive multicast route depending on how an EVI is configured on each of those VLT peers in a given VLT domain.

TABLE 4

| EVI Spans | Inclusive Multicast Route Carries |
|---|---|
| All the VLT Peers | Anycast IP Address Allocated for all the VLT Peers |
| Subset of VLT Peers | Anycast IP Address Allocated for the subset of VLT Peers |
| Individual VLT Nodes | IP Address allocated for Individual VLT Nodes. |

For the case of a VLT node join, when a new PE joins the VLT domain and it is also configured with an EVI that spans across one or more VLT peers, it should use the Anycast VTEP-IP that represents the new VLT subset to advertise the inclusive multicast route. Consequently, the PEs of the VLT subset that existed prior to the new PE joining the VLT domain must withdraw the inclusive multicast route that was advertised with an Anycast-IP and that represented the old VLT subset, and re-advertise the route with the Anycast VTEP-IP that represents new VLT subset.

In the case of a VLT node split, when a PE leaves/splits from a VLT domain, it creates a new VLT subset. Furthermore, if the PE is configured with an EVI that spanned across more than one VLT peer, the PEs of resultant VLT subset must withdraw the inclusive multicast route that was advertised with Anycast VTEP-IP that represented the old VLT subset, and re-advertise the route with the Anycast VTEP-IP that represents the new VLT subset. Subsequently, if the PE that was split from the VLT domain continues to participate in the same EVI, it has to re-advertise an inclusive multicast route with the secondary VTEP-IP used to represent that PE by itself.

Figure 6:
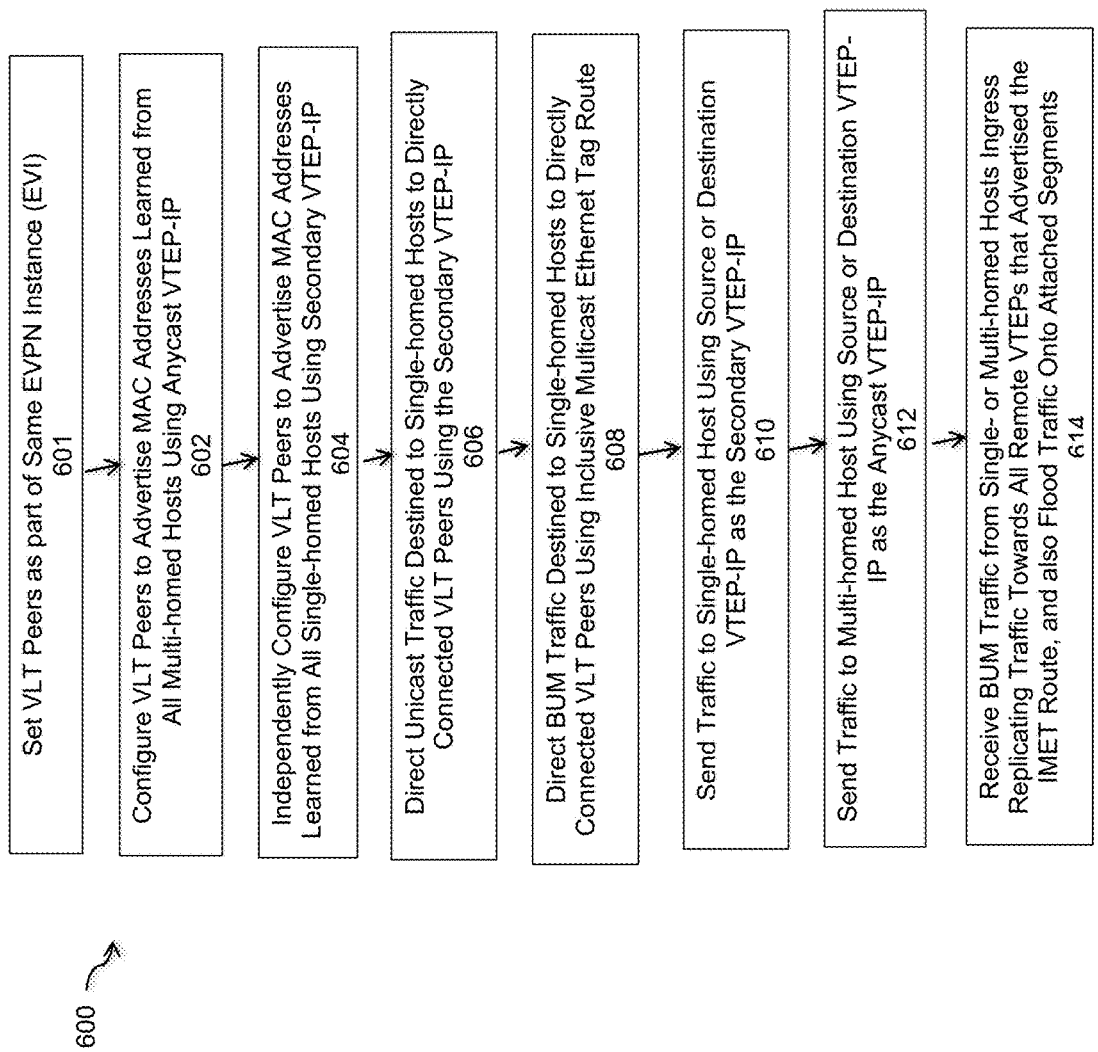
FIG. 6 is a flowchart that illustrates an overall method of optimizing traffic paths for orphaned hosts in a VXLAN system, under some embodiments.

FIG. 6 is a flowchart that illustrates an overall method of optimizing traffic paths for orphaned hosts in a VXLAN system, under some embodiments. As shown in FIG. 6, the process 600 begins by setting the VLT peers to be part of the same EVPN instance (EVI). It then configures VLT peers to advertise MAC addresses learned from all multi-homed hosts in the system using Anycast VTEP-IP, step 602. Next, the VLT peers are independently configured to advertise MAC addresses learned from all single-homed hosts in the system using a secondary VTEP-IP, step 604. Unicast traffic destined to the single-homed hosts is then directed to directly connected VLT peers using the secondary VTEP-IP, step 606, and BUM traffic destined to the single-homed hosts to directly connected VLT peers is directed using the VTEP-IP from the Inclusive Multicast Ethernet Tag route, step 608.

For receiving a packet from a host (single or multi-homed) and transmitting a packet to a host (single or multi-homed), the process performs four basic sub-steps. First, if receiving a packet from a single homed host, it sets the source IP to a secondary address; and second, if receiving a packet from a multi-homed host, it sets the source IP to the appropriate Anycast address for the ESI. Third, based on a destination lookup, if a packet is destined to a single-homed host, the process sets it to the secondary VTEP-IP (this is the address advertised by BGP for the destination MAC in question), step 610; and fourth, based on the destination lookup, if the packet is destined to a multi-homed host, the process sets it to the appropriate Anycast VTEP-IP (this is the address advertised by BGP for the destination MAC address) step 612.

For the BUM traffic in block 608, for a VLT peer receiving BUM traffic from either multi-homed hosts or single-homed hosts, the process ingress replicates traffic towards all the remote VTEP endpoints that have advertised the Inclusive Multicast Ethernet Tag Route within the EVI; it also floods the traffic onto all of the locally attached Ethernet segments in that EVI as well, step 614.

Figure 7:
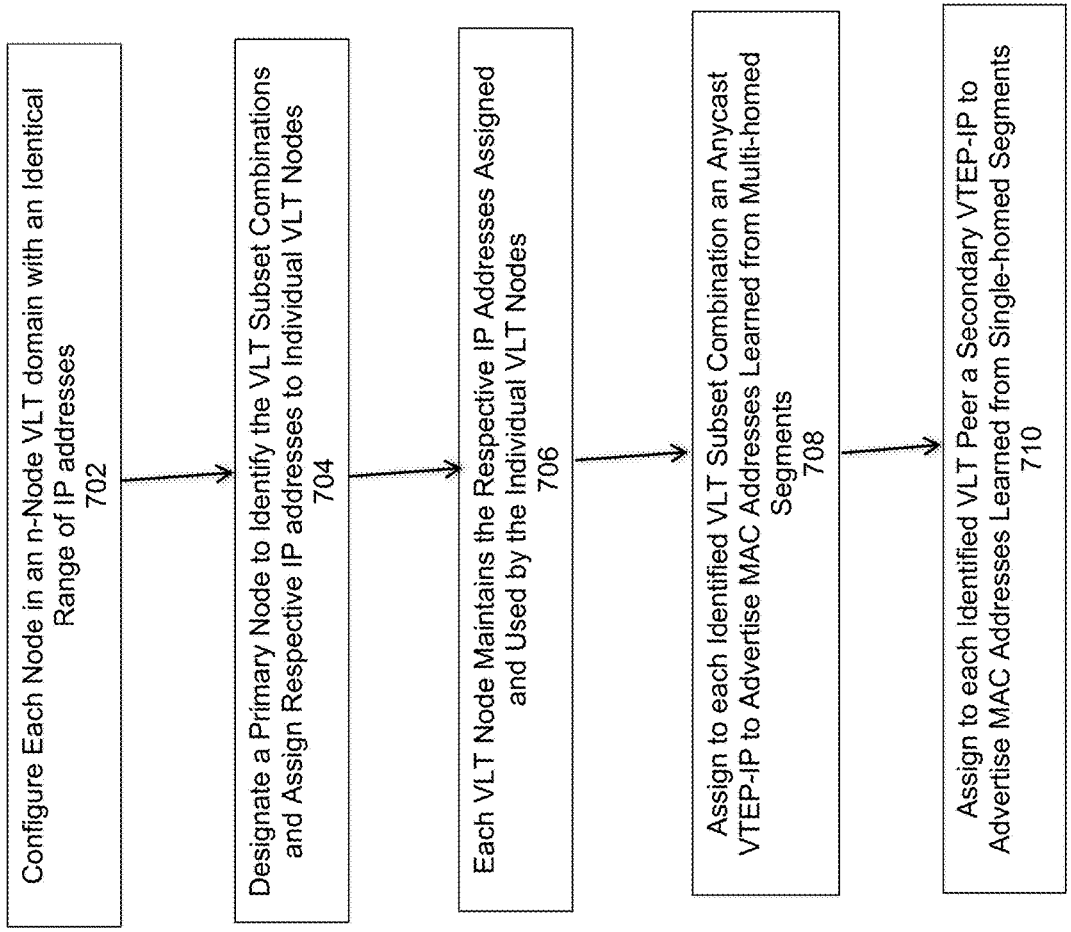
FIG. 7 is a flowchart that illustrates a general process of assigning and managing the Anycast VTEP-IP and secondary VTEP-IP to the VLT peers, under an embodiment.

The general process of assigning and managing the Anycast VTEP-IP and secondary VTEP-IP to the VLT peers is performed through a dynamic VTEP-IP allocation scheme for VLT peers, as shown in the flowchart of FIG. 7. Process 700 starts with step 702 configuring each node in an n-node VLT domain with an identical set of $(2^n-n-1)$ IP addresses to be used as the Anycast VTEP-IPs for all possible $(2^n-n-1)$ subset combinations of the n-nodes. The process designates a primary node to identify the VLT subset combinations and assign respective IP addresses to individual VLT nodes, step 704. In step 706, each VLT peer maintains the respective IP addresses assigned and used by the individual VLT nodes. For route advertisements, the process assigns to each identified VLT subset combination, an Anycast VTEP-IP to advertise the MAC addresses learned from multi-homed Ethernet segments, step 708. Each node in the VLT also has a secondary VTEP-IP to advertise the MAC addresses learned from single-homed Ethernet segments, step 710.

The network server computers and client computers shown in FIGS. 1 and 2 are coupled together over a network that may be a LAN, WAN or other appropriate network. The network provides connectivity to the various systems, components, and resources of the system, and may be implemented using protocols such as Transmission Control Protocol (TCP) and/or Internet Protocol (IP) as in hypertext transport protocols (HTTP), well known in the relevant arts. For network coding environments, the network may comprise ad hoc networks, multicast switches, wireless networks, p2p (peer-to-peer) messaging, SDN networks, and Internet of Things (IoT) application networks, among other appropriate networks.

Figure 8:
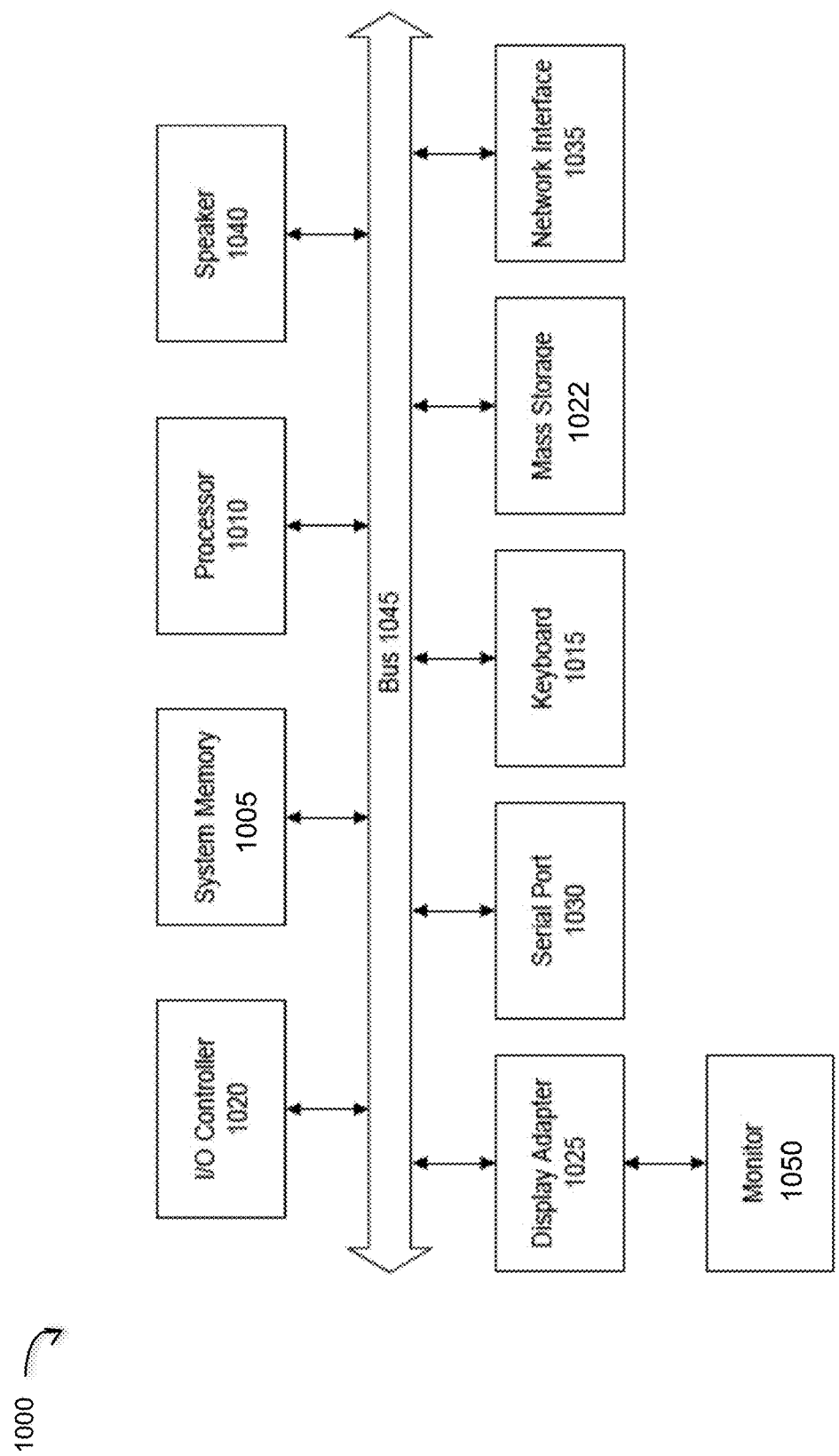
FIG. 8 shows a system block diagram of a computer or processing system used to execute one or more software components of the present system described herein.

The network environment of FIGS. 1 and 2 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer or processing system used to execute one or more software components of the present system described herein. The computer system 1000 includes a monitor 1050, keyboard 1015, and mass storage devices 1022. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory. Certain of these components, such as processor 1010 may be embodied in a device other than a standalone computer, such as in a network device that is capable of executing programmed software instructions.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows® family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for optimizing traffic paths for orphaned hosts in a VXLAN system, comprising:
    configuring virtual link trunking (VLT) peers to advertise MAC addresses learned from all multi-homed hosts in the system using an Anycast VXLAN tunnel endpoint-Internet Protocol address (VTEP-IP);
    configuring the virtual link trunking (VLT) peers to advertise MAC addresses learned from all single-homed hosts in the system using a secondary VTEP-IP;
    directing unicast traffic destined to the single-homed hosts to VLT peers directly connected to the single-homed hosts using the secondary VTEP-IP;
    directing Broadcast, unknown unicast, and multicast (BUM) traffic destined to the single-homed hosts to VLT peers directly connected to the single homed hosts using an Inclusive Multicast Ethernet Tag route, wherein the Anycast VTEP-IP and secondary VTEP-IP are assigned to the VLT peers through a dynamic VTEP-IP allocation scheme for VLT peers;
    configuring each node in an n-node VLT domain with an identical set of $(2^n-n-1)$ IP addresses, to be used as the Anycast VTEP-IPs for all possible $(2^n-n-1)$ subset combinations of the n-nodes;
    designating a primary node to identify the VLT subset combinations and assign respective IP addresses to individual VLT nodes;
    maintaining, in each VLT peer, the respective IP addresses assigned and used by the individual VLT nodes;
    assigning, to each identified VLT subset combination, an Anycast VTEP-IP to advertise the MAC addresses learned from multi-homed Ethernet segments; and
    assigning, to each individual VLT peer, a secondary VTEP-IP to advertise the MAC addresses learned from single-homed Ethernet segments.

2. The method of claim 1 further comprising:
    if receiving a packet from a single homed host, setting a source IP to a secondary address;
    if receiving a packet from a multi-homed host, setting the source IP to an appropriate Anycast address;
    if a packet is destined to a single-homed host based on a destination lookup, setting a destination address as the secondary VTEP-IP; and
    if the packet is destined to a multi-homed host based on the destination lookup, setting the destination address to an appropriate Anycast VTEP-IP.

3. The method of claim 1 wherein, for unicast traffic and single-homed hosts, the method further comprises:
    encapsulating originating traffic into a VXLAN packet with a source VTEP-IP set to the secondary VTEP-IP assigned to handle all traffic to and from the single-homed hosts for transmission to a destination VTEP; and setting the destination VTEP-IP for inbound traffic destined to the single-homed hosts as the secondary VTEP-IP that advertised the MAC addresses learned from the single-homed hosts.

4. The method of claim 1 wherein, for BUM traffic, the method further comprises:

receiving, in a VLT peer, BUM traffic from either multi-homed hosts or single-homed hosts, ingress replicates the received traffic towards all remote VTEP endpoints that have advertised the Inclusive Multicast Ethernet Tag Route; and flooding the received traffic onto all locally attached Ethernet segments that are configured for that EVI.

5. The method of claim 4 wherein VXLAN system implements a routing protocol comprising a border gateway protocol-Ethernet VPN (BGP-EVPN).

6. The method of claim 5 wherein the BGP-EVPN system implements a multi-homing mechanism comprising one of a Link Aggregation or Virtual Link Trunking feature of network interface hardware in the system.

7. The method of claim 1 further comprising setting two or more of the VLT peers to be part of the same EVPN instance.

8. The method of claim 1 further comprising:
detecting a new VLT peer joining the VLT domain;
dispensing, from the primary node, the set of Anycast and secondary VTEP-IP addresses to be used for multi-homed and single-homed traffic, and
in the event the new VLT peer is attached to and EVI that is also attached to a VLT peer in the same VLT domain, advertising all MAC addresses learned on the Ethernet segment with a new Anycast VTEP-IP assigned to the respective VLT subset combination.

9. The method of claim 1 further comprising:
detecting a new VLT peer splitting from the VLT domain;
assuming, in any remaining VLT peers in the VLT domain, the Anycast VTEP-IP that was assigned for the VLT subset combination not containing the split VLT peer; and
re-advertising all MAC addresses learned from the attached Ethernet segment with the assumed Anycast VTEP-IP as a next hop.

10. A system for optimizing traffic paths for orphaned hosts in a VXLAN system, comprising:
a first component configuring virtual link trunking (VLT) peers to advertise MAC addresses learned from all multi-homed hosts in the system using Anycast VXLAN tunnel endpoint-Internet Protocol address (VTEP-IP), configuring the virtual link trunking (VLT) peers to advertise MAC addresses learned from all single-homed hosts in the system using a secondary VTEP-IP; and
a transmission interface directing unicast traffic destined to the single-homed hosts to VLT peers directly connected to the single-homed hosts using the Secondary VTEP-IP, and directing Broadcast, unknown unicast, and multi-cast (BUM) traffic destined to the single-homed hosts to VLT peers directly connected to the single-homed hosts using an Inclusive Multicast Ethernet Tag route, wherein the Anycast VTEP-IP and secondary VTEP-IP are assigned to the VLT peers through a dynamic VTEP-IP allocation scheme for VLT peers, the transmission interface further configuring each node in an n-node VLT domain with an identical set of ($2^n-n-1$) IP addresses, to be used as the Anycast VTEP-IPs for all possible ($2^n-n-1$) subset combinations of the n-nodes; designating a primary node to identify the VLT subset combinations and assign respective IP addresses to individual VLT nodes; maintaining, in each VLT peer, the respective IP addresses assigned and used by the individual VLT nodes; assigning, to each identified VLT subset combination, an Anycast VTEP-IP to advertise the MAC addresses learned from multi-homed Ethernet segments; and assigning, to each individual VLT peer, a secondary VTEP-IP to advertise the MAC addresses learned from single-homed Ethernet segments.

11. The system of claim 10 wherein the system further comprises:
a second component configured to set a source IP to a secondary address if receiving a packet from a single homed host, and set the source IP to an appropriate Anycast address if receiving the packet from a multi-homed host; and
a third component setting a destination address as the secondary VTEP-IP if a packet is destined to a single-homed host based on a destination lookup, and setting the destination address to an appropriate Anycast VTEP-IP if the packet is destined to a multi-homed host based on the destination lookup.

12. The system of claim 10 wherein, for BUM traffic, the system further comprises a fifth component receiving, in a VLT peer, BUM traffic from either multi-homed hosts or single-homed hosts, ingress replicates the received traffic towards all remote VTEP endpoints that have advertised the Inclusive Multicast Ethernet Tag Route, and flooding the received traffic onto all locally attached Ethernet segments in the EVI for those packets.

13. The system of claim 10 wherein the VXLAN system implements a routing protocol comprising a border gateway protocol-Ethernet VPN (BGP-EVPN).

14. The system of claim 13 wherein the BGP-EVPN system implements a multi-homing mechanism comprising one of a Link Aggregation or Virtual Link Trunking feature of network interface hardware in the system.

15. A computer program product, comprising a non-transitory computer-readable medium having a computer-readable program code embodied therein, the computer-readable program code adapted to be executed by one or more processors to optimize traffic paths for orphaned hosts in a VXLAN system, comprising:
configuring virtual link trunking (VLT) peers to advertise MAC addresses learned from all multi-homed hosts in the system using Anycast VXLAN tunnel endpoint-Internet Protocol (VTEP-IP);
configuring the virtual link trunking (VLT) peers to advertise MAC addresses learned from all single-homed hosts in the system using a secondary VTEP-IP;
directing unicast traffic destined to the single-homed hosts to directly connected VLT peers using the Secondary VTEP-IP;
directing Broadcast, unknown unicast, and multi-cast (BUM) traffic destined to the single-homed hosts to directly connected VLT peers using an Inclusive Multicast Ethernet Tag routing, wherein the Anycast VTEP-IP and secondary VTEP-IP are assigned to the VLT peers through a dynamic VTEP-IP allocation scheme for VLT peers;
configuring each node in an n-node VLT domain with an identical set of ($2^n-n-1$) IP addresses, to be used as the Anycast VTEP-IPs for all possible ($2^n-n-1$) subset combinations of the n-nodes;

designating a primary node to identify the VLT subset combinations and assign respective IP addresses to individual VLT nodes;

maintaining, in each VLT peer, the respective IP addresses assigned and used by the individual VLT nodes;

assigning, to each identified VLT subset combination, an Anycast VTEP-IP to advertise the MAC addresses learned from multi-homed Ethernet segments; and assigning, to each individual VLT peer, a secondary VTEP-IP to advertise the MAC addresses learned from single-homed Ethernet segments.

16. The computer program product of claim 15, wherein the program code is further adapted to:

if receiving a packet from a single homed host, setting a source IP to a secondary address;

if receiving a packet from a multi-homed host, setting the source IP to an appropriate Anycast address;

if a packet is destined to a single-homed host based on a destination lookup, setting a destination address as the secondary VTEP-IP; and if the packet is destined to a multi-homed host based on the destination lookup, setting the destination address to an appropriate Anycast VTEP-IP.

17. The computer program product of claim 15, wherein the program code is further adapted to, for unicast traffic and single-homed hosts:

encapsulating originating traffic into a VXLAN packet with a source VTEP-IP set to the secondary VTEP-IP assigned to handle all traffic to and from the single-homed hosts for transmission to a destination VTEP; and setting the destination VTEP-IP for inbound traffic destined to the single-homed hosts as the secondary VTEP-IP that advertised the MAC addresses learned from the single-homed hosts.

18. The computer program product of claim 15, wherein the program code is further adapted to, for BUM traffic:

receiving, in a VLT peer, BUM traffic from either multi-homed hosts or single-homed hosts, ingress replicates the received traffic towards all remote VTEP endpoints that have advertised the Inclusive Multicast Ethernet Tag Route; and flooding the received traffic onto all locally attached Ethernet segments that are configured for that EVI.

* * * * *